H. L. ROBERTS.
TAG STRINGING MACHINE.
APPLICATION FILED MAY 21, 1918.

1,365,853.

Patented Jan. 18, 1921.
10 SHEETS—SHEET 1.

INVENTOR
Horace L. Roberts
BY
Frank V. Briesen
ATTORNEY

H. L. ROBERTS.
TAG STRINGING MACHINE.
APPLICATION FILED MAY 21, 1918.

1,365,853.

Patented Jan. 18, 1921.
10 SHEETS—SHEET 4.

INVENTOR
Horace L. Roberts
BY
ATTORNEY

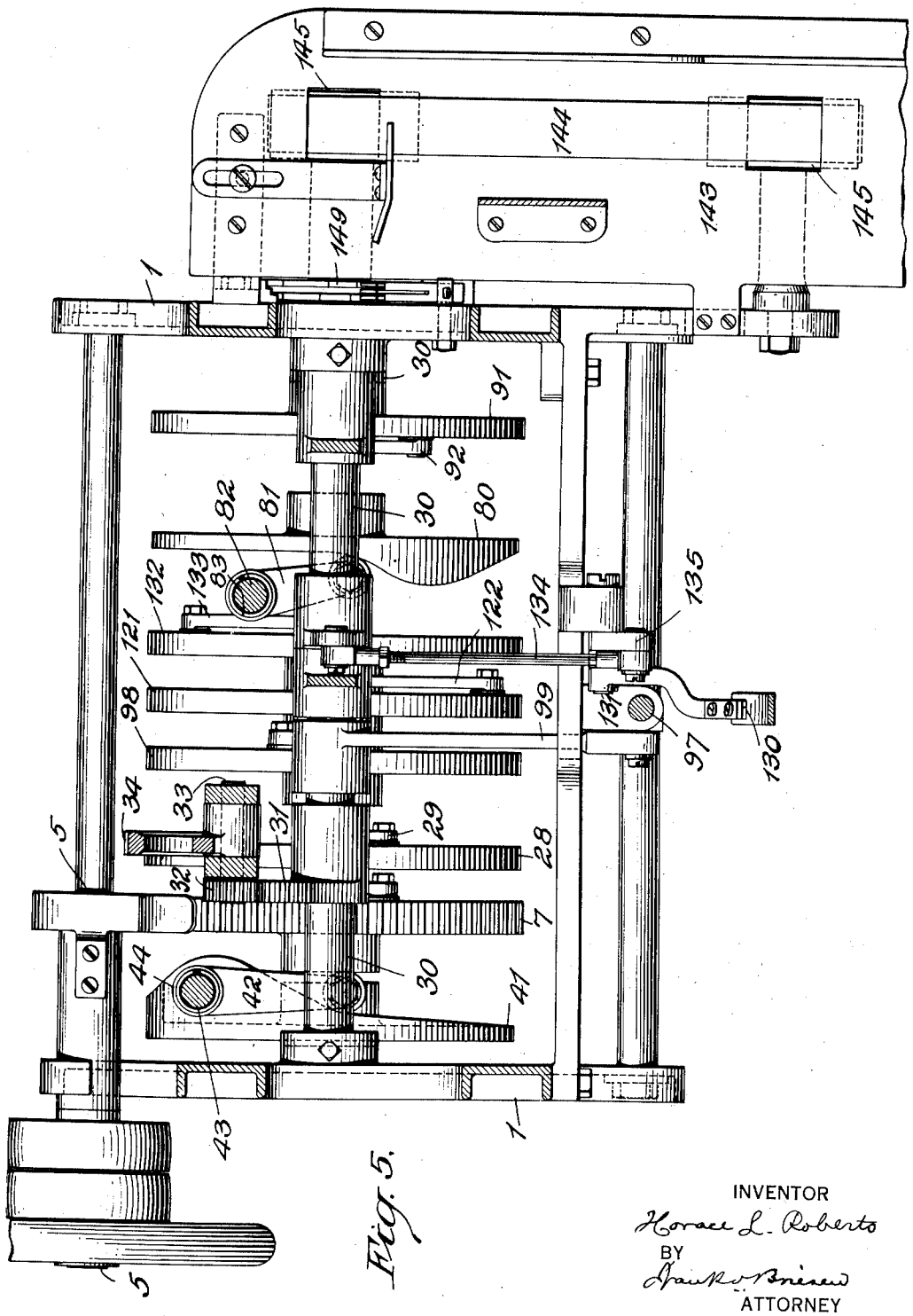

H. L. ROBERTS.
TAG STRINGING MACHINE.
APPLICATION FILED MAY 21, 1918.

1,365,853.

Patented Jan. 18, 1921.
10 SHEETS—SHEET 6.

INVENTOR
Horace L. Roberts
BY
ATTORNEY

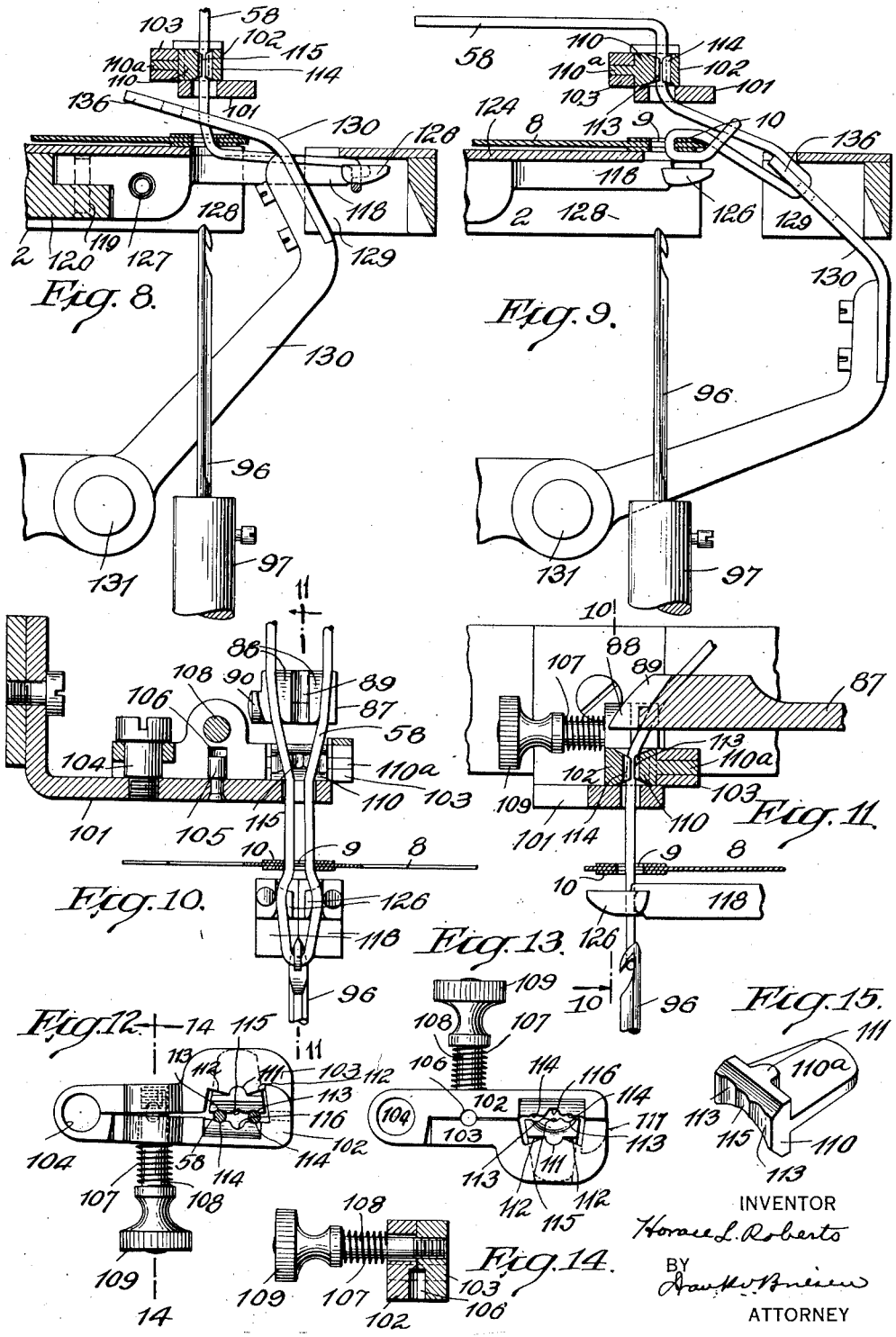

H. L. ROBERTS.
TAG STRINGING MACHINE.
APPLICATION FILED MAY 21, 1918.
1,365,853.
Patented Jan. 18, 1921.
10 SHEETS—SHEET 8.
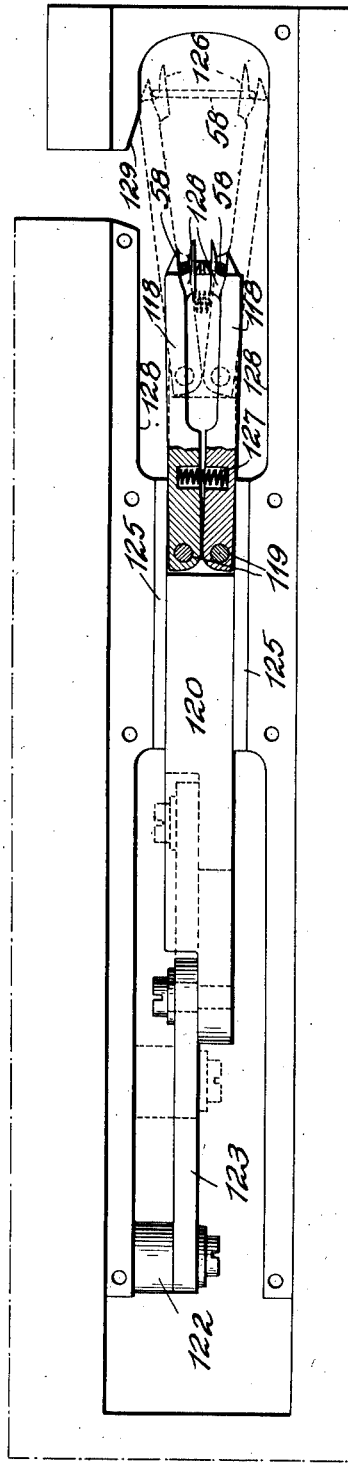
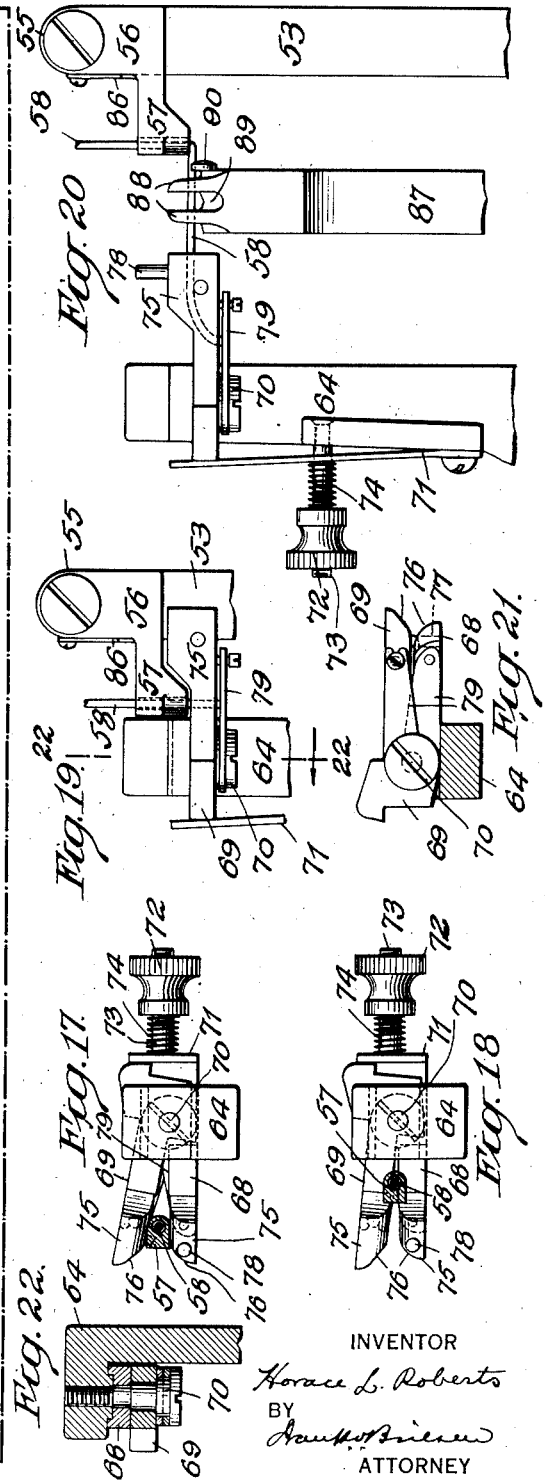
INVENTOR
Horace L. Roberts
BY
ATTORNEY H. L. ROBERTS.
TAG STRINGING MACHINE.
APPLICATION FILED MAY 21, 1918.
1,365,853.
Patented Jan. 18, 1921.
10 SHEETS—SHEET 9.
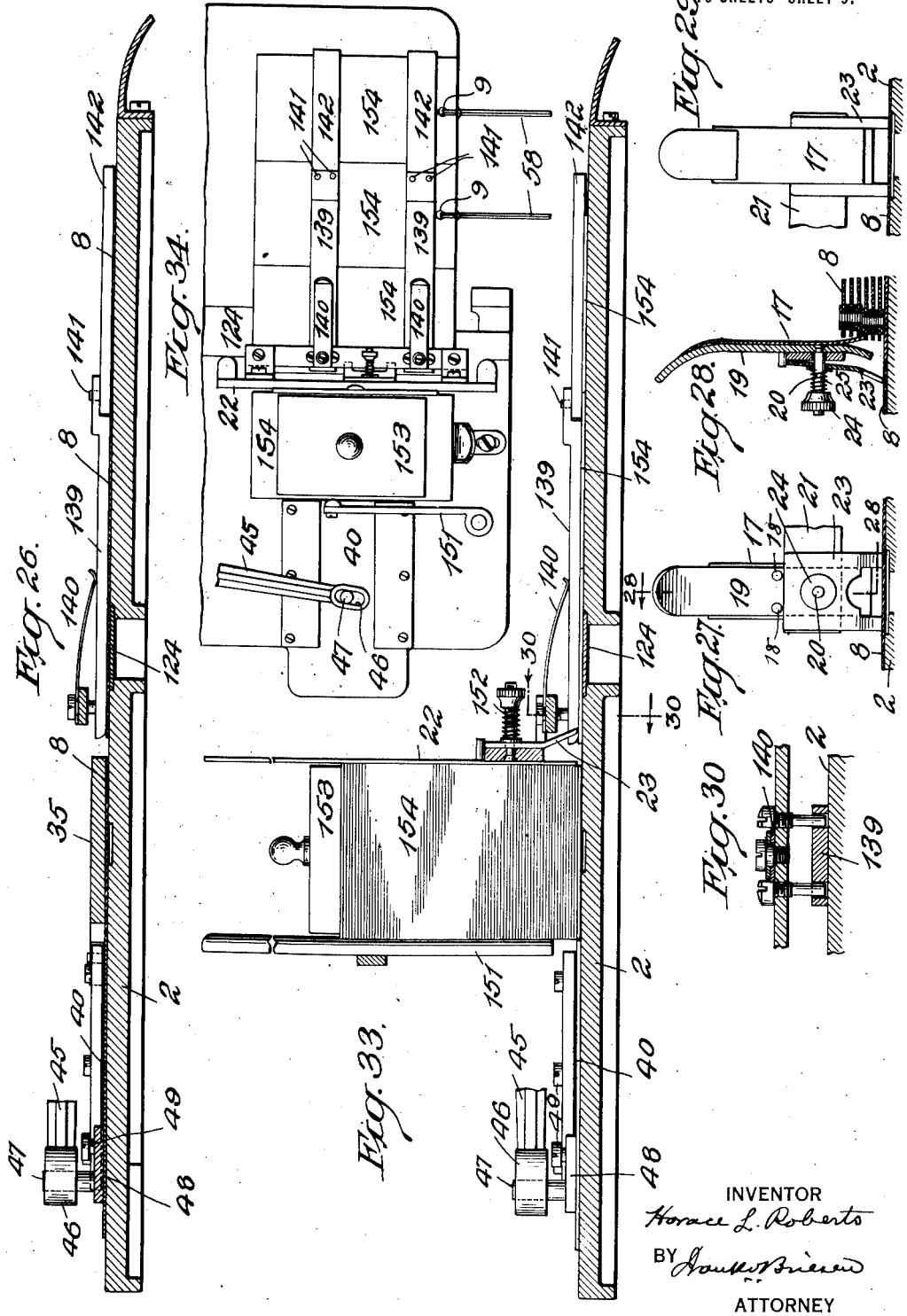
INVENTOR
Horace L. Roberts
BY
ATTORNEY

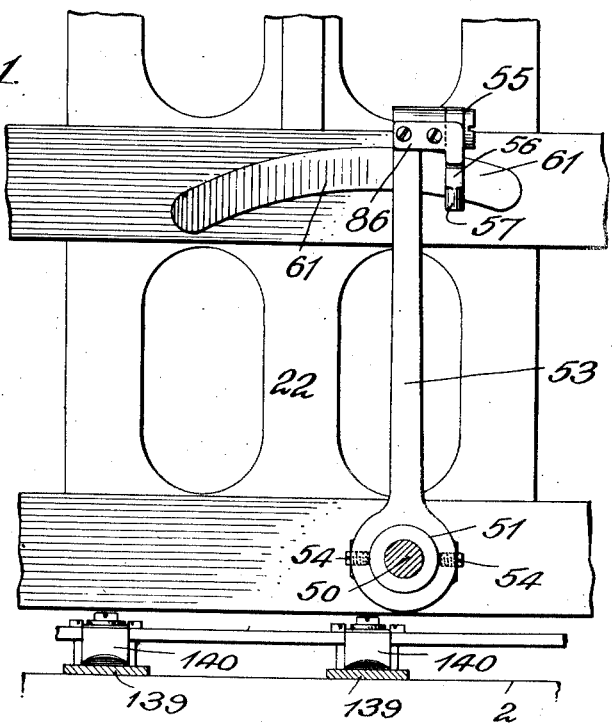
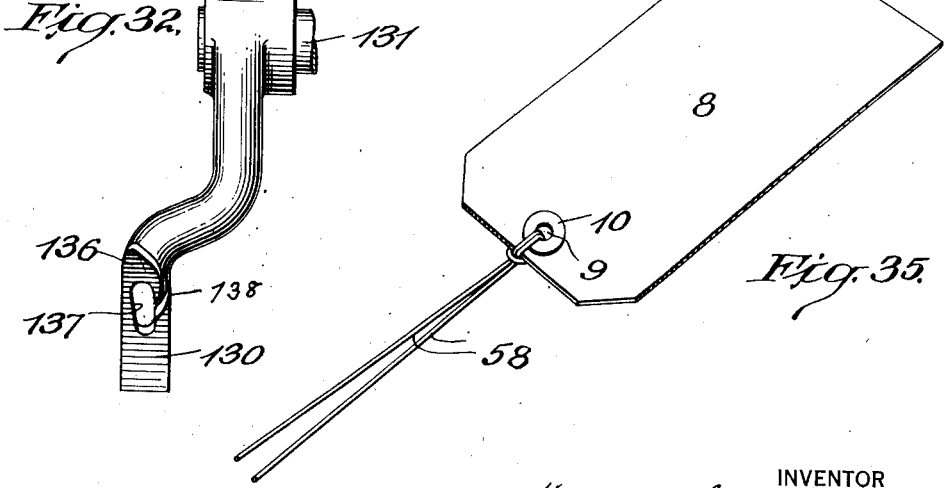

UNITED STATES PATENT OFFICE.

HORACE L. ROBERTS, OF BROOKLYN, NEW YORK.

TAG-STRINGING MACHINE.

1,365,853.  Specification of Letters Patent.  Patented Jan. 18, 1921.

Application filed May 21, 1918. Serial No. 235,764.

*To all whom it may concern:*

Be it known that I, HORACE L. ROBERTS, a citizen of the United States, and a resident of Brooklyn, in the county of Kings and State of New York, have invented certain new and useful Improvements in Tag-Stringing Machines, of which the following is a specification.

This invention relates to a machine of novel construction for stringing tags, by supplying the tags with the conventional tie strings that are threaded through the eyes of the tags, and are then looped in such a manner as to become firmly attached thereto. The machine automatically performs all the stringing operations in a quick and reliable manner, and is furthermore so constituted that it may be readily set for stringing larger or smaller tags and for supplying them with correspondingly larger or smaller tie strings.

The invention comprises the various features of novelty more fully pointed out in the specification and appended claims.

Figure 1:
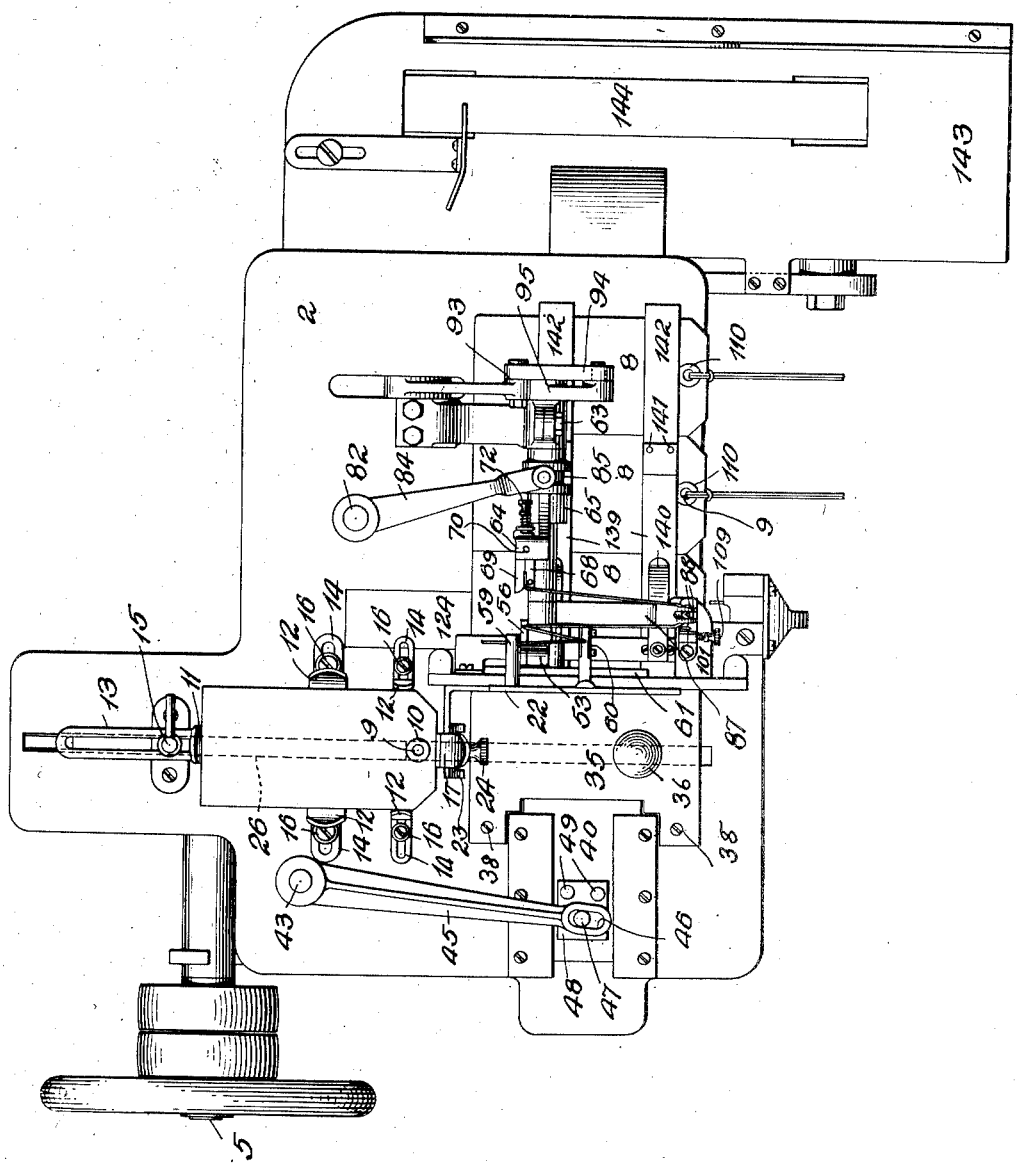
Figure 2:
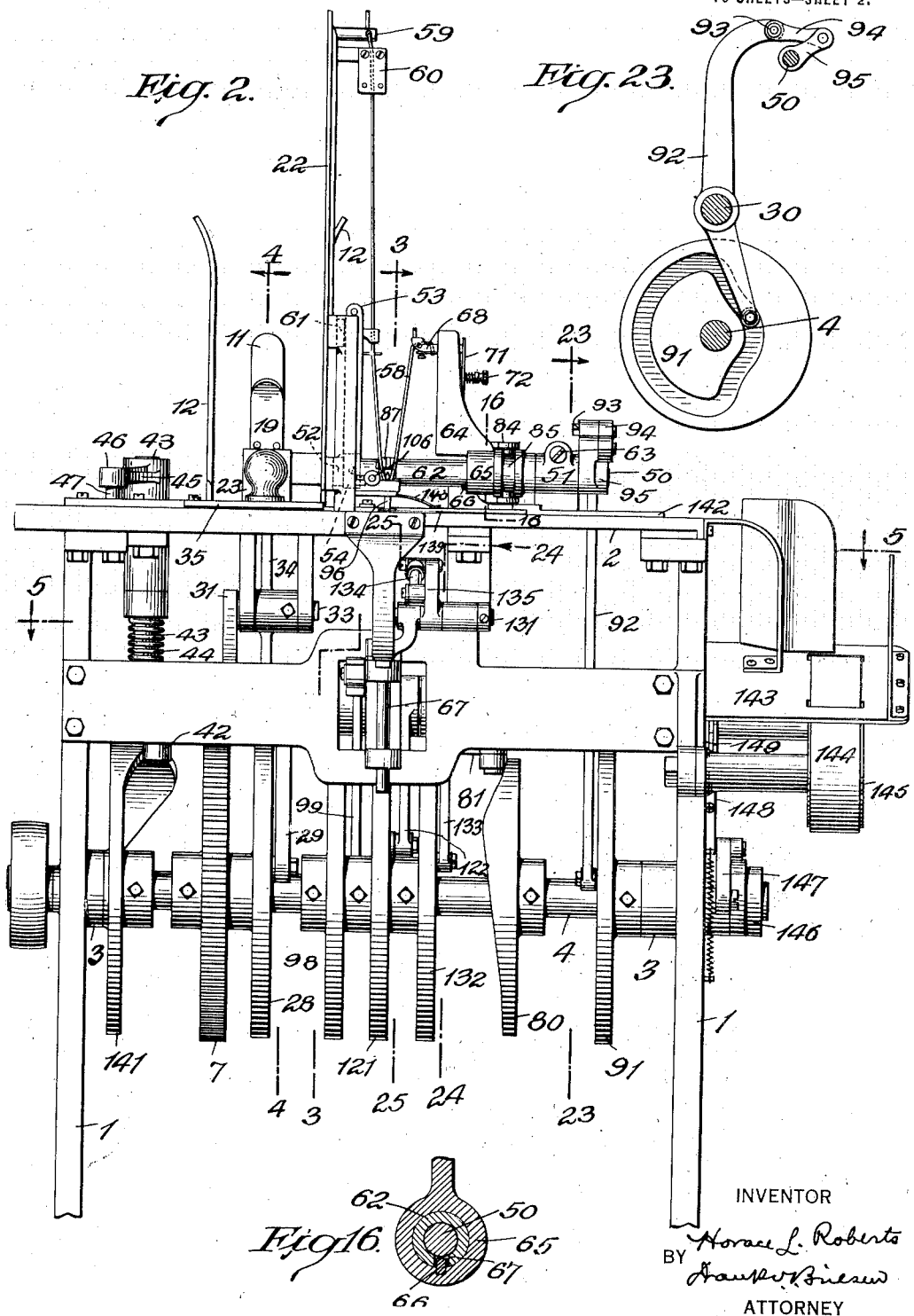
Figure 3:
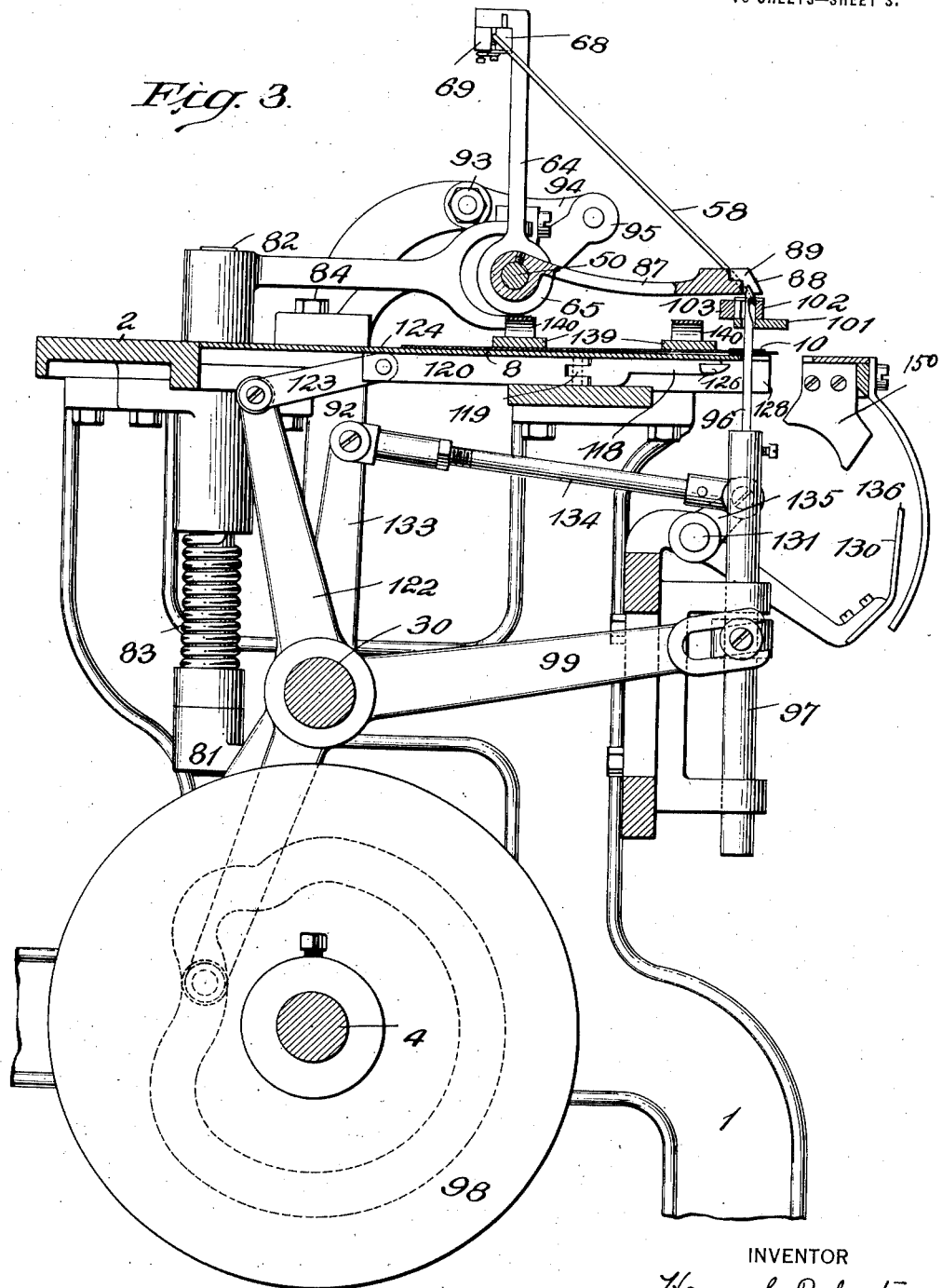
Figure 4:
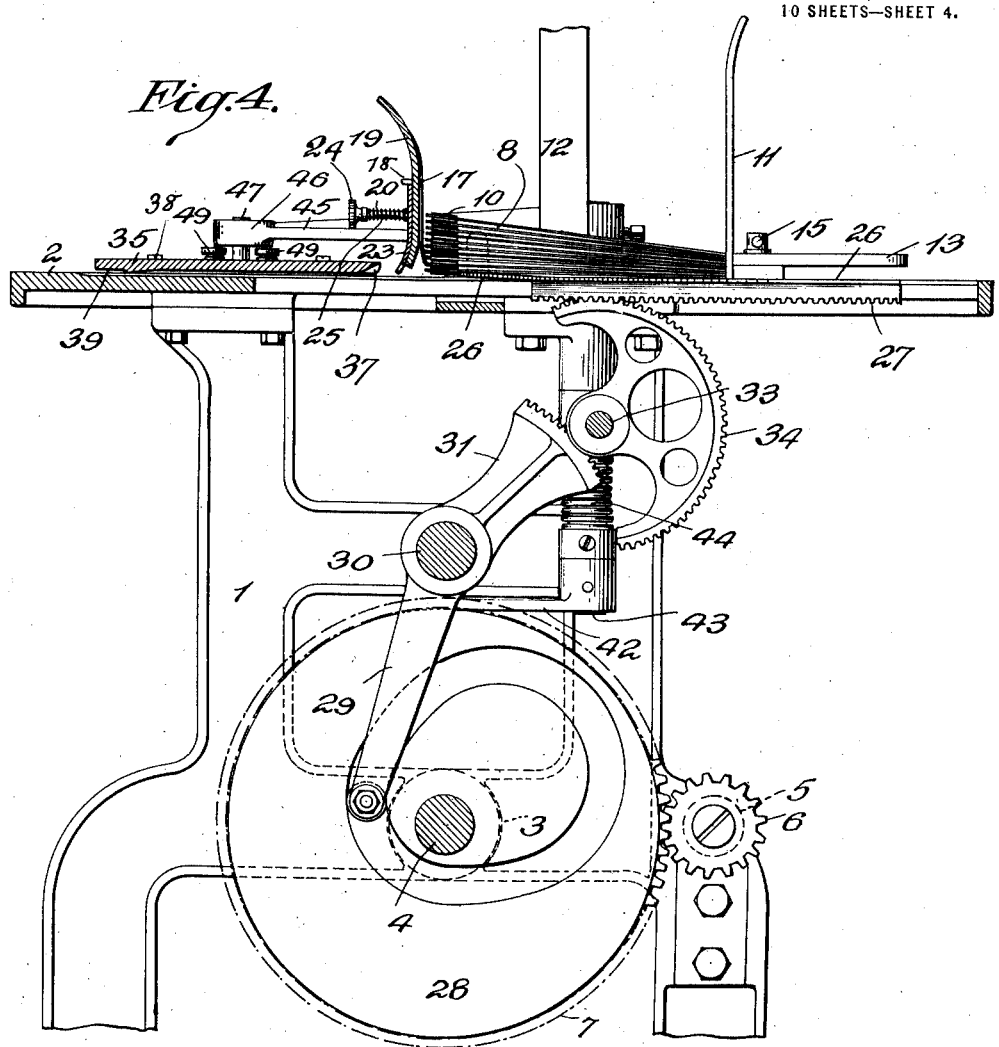
Figures 24, 25:
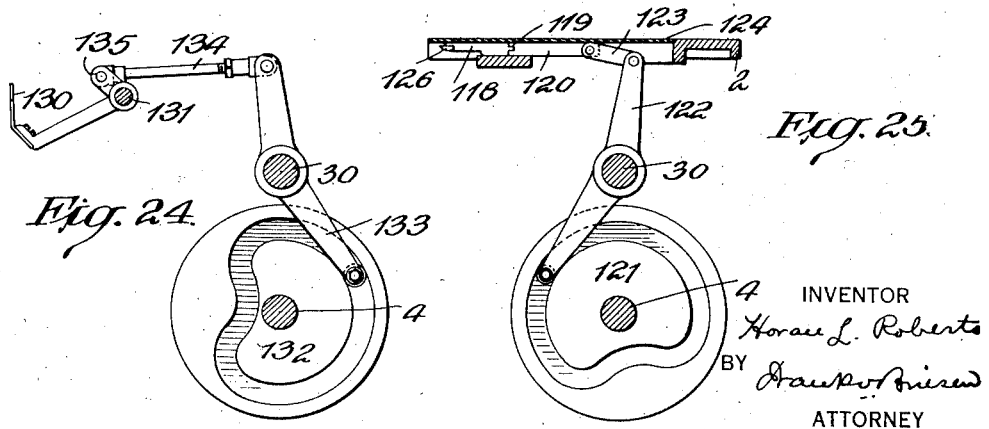
Figure 6:
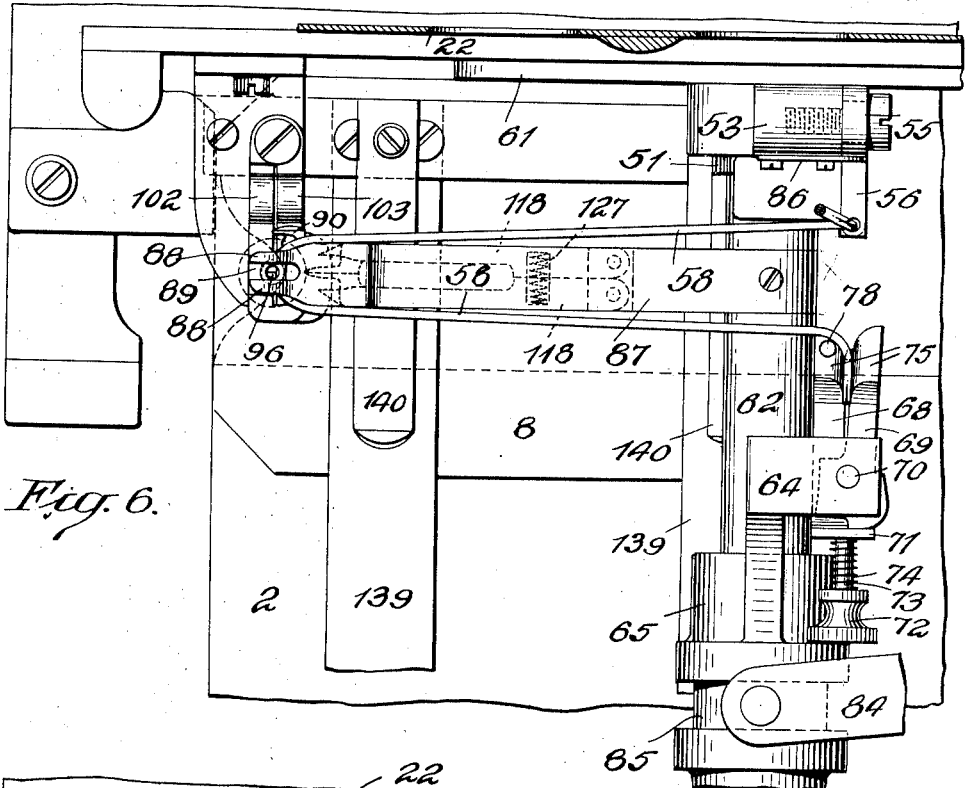
Figure 7:
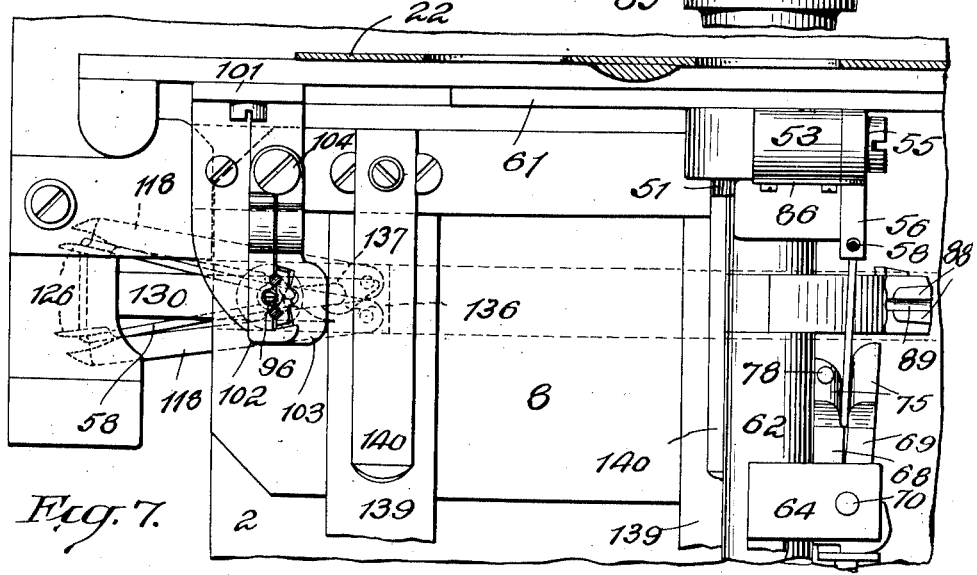

In the accompanying drawings:

Figure 1 is a plan of a tag stringing machine embodying my invention;

Fig. 2, a front elevation;

Fig. 3 a cross section on line 3—3 Fig. 2;

Fig. 4, a cross section on line 4—4 Fig. 2;

Fig. 5, a horizontal section on line 5—5 Fig. 2;

Fig. 6, a plan of the looping mechanism;

Fig. 7, a similar plan showing the parts in different position;

Fig. 8, a section through the spreader and tension device;

Fig. 9, a similar section showing the parts in different positions;

Fig. 10, is a section on line 10—10 Fig. 11;

Fig. 10ª, a detail of the spreader;

Fig. 11, a section on line 11—11 Fig. 10;

Fig. 12, a plan view of the tension device;

Fig. 13, a bottom view thereof;

Fig. 14, a section on line 14—14 Fig. 12;

Fig. 15, a perspective view of the rocking member;

Fig. 16, a section on line 16—16 Fig. 2;

Fig. 17, a plan view of the combined thread carrier and cutter showing it opened;

Fig. 18, a similar view showing it closed;

Fig. 19, an elevation of the thread holder and the thread carrier;

Fig. 20, a rear elevation thereof, showing the loop-forming arm;

Fig. 21, a bottom view of the thread carrier;

Fig. 22, a section on line 22—22 Fig. 19;

Fig. 23, a section on line 23—23 Fig. 2;

Fig. 24, a section on line 24—24 Fig. 2;

Fig. 25, a section on line 25—25 Fig. 2;

Fig. 26, a longitudinal section of the bed plate;

Fig. 27, a front view of the presser foot and adjoining parts;

Fig. 28, a section on line 28—28 Fig. 27;

Fig. 29, a rear view of the same;

Fig. 30, a section on line 30—30 Fig. 33;

Fig. 31, a right hand face view of the partition and adjoining parts partly broken away;

Fig. 32, a plan of the looper;

Fig. 33, a vertical longitudinal section of a modification;

Fig. 34 is a plan of the modification;

Fig. 35 a perspective view of the tag strung.

A frame 1, carrying a top plate or table 2, is furnished with bearings 3, in which is journaled, a longitudinally extending cam shaft 4. This shaft receives continuous rotary movement from a power shaft 5 by gear wheels 6, 7 and serves to actuate all of the operative parts of the machine.

The tags 8 to be strung, are provided at one of their ends with eyes 9, reinforced on both sides by rings or patches 10. These tags are stacked up on table 2, near one end thereof in such a manner that their eyed ends project forwardly (Fig. 4) and that their longitudinal axis extends transversely to the longitudinal axis of table 2 (Fig. 1). That part of table 2 on which the tags are thus stacked, forms a magazine, by means of a rear gage 11, and a plurality of side gages 12, the gages being rendered adjustable, by means of slotted extensions 13, 14 and set screws 15, 16, so that in this way, the size of the magazine may be changed to accommodate tags that differ in length and width.

Owing to the fact that the reinforced eyed front ends of the stacked tags will be thicker than their rear ends, the pile of tags will be fan-shaped in cross section (Fig. 4). Means are provided at the front of the tags, that force them slightly against the rear gage 11 and thus prevent them from being raised, during the movement of the spring-plunger hereinafter referred to. These means comprise a spring blade 17 (Figs. 27–29) that extends vertically across the front ends of the tags, and thus constitutes the front of the magazine, the bottom of the spring being slightly raised off the table to form a clearance for the passage of the tags. Blade 17 is affixed at its upper end to a plate 19 which is in turn by screw 20 and angle bracket 21 secured to a partition 22 extending across table 2. To bracket 21 is likewise secured by screw 20 an arched presser foot 23, adapted to bear upon the table with sufficient tension to permit the passage of the tag engaged by the plunger while holding back the remaining tags. The tension of this presser foot, may be adjusted by means of a nut 24, engaging a spring 25, that is coiled around screw 20, and bears against the presser foot. Pins 18, on plate 19 engage the upper edge of presser foot 23, and serve to hold the same squarely upon the table.

The means for advancing successive bottom tags consist of a spring plunger 26, that extends axially of the magazine, and is affixed at its rear end to a reciprocal rack 27 while its front end is deflected normally slightly above the level of the table 2, so as to engage the lower ring 10 of the bottom tag 8. Rack 27 receives its to and fro motion from shaft 4 by means of a cam 28 and cam lever 29, turning on countershaft 30, and provided with a toothed segment 31 engaging a pinion 32. This pinion turns on a stub shaft 33, carrying a toothed segment 34 which engages rack 27, so that in this way rotation of cam 28 will cause a forward and backward stroke of rack 27 and consequently of spring plunger 26.

In its retracted position, the spring plunger engages from the rear, the lowermost ring 10 of the bottom tag (Fig. 4). As the plunger advances it will push such bottom tag out of the magazine underneath notched blade 17 and presser foot 23, delivering it a short distance in front of the magazine. During this movement, the plunger, owing to its resiliency, will have a tendency to rise as soon as it has cleared the spring blade and presser foot. When now, the plunger is retracted, it will again be gradually forced down by the lower end of the spring blade, which will cause it to properly engage the "patch" of the now lowermost tag, the entire stack having sagged slightly by the withdrawal of the bottom tag.

That portion of table 2, upon which tag 8 is pushed by the plunger (and which is located in front of the magazine) is provided with a pressure platen 35, of a size to cover up the tag, said platen being weighted as at 36 and furnished with a beveled rear edge 37 (Fig. 4). As the tag is fed forward, it will thus be pushed underneath the pressure platen, said platen rising to a slight extent on guides or pins 39, so as to compensate for the thickness of the tag. Near its forward end, platen 35 is on its under side, provided with a step or shoulder 39, beneath which the uppermost "patch" of the advanced tag will be carried by the spring plunger, so that upon the plunger's return movement the tag will be stripped off the same and left where deposited.

It will be seen that as thus far described, the tags are successively withdrawn in orderly manner from the fan-shaped stack and carried underneath the platen which holds them in a flat position upon table 2. From underneath this platen, the tags are successively pushed out by means of a slider, operating at right angles to plunger 26, and (with the embodiment shown) carrying the tags to the right of the platen. Slider 40 is reciprocated from shaft 4, by a cam 41 and a cam lever 42, mounted on upright rock shaft 43, which is encompassed by spring 44, that tends to hold lever 42 into engagement with its cam. Shaft 43, carries an arm 45, having an elongated eye 46, engaging a pin 47 of slider 40, so that in this way a rotation of the cam will cause a reciprocal movement of the slider. The latter is preferably so connected to its operative mechanism that the reach of its forward stroke may be adjusted, thus adapting the machine to feed wider or narrower tags. With the embodiment shown, this result is obtained by mounting pin 47 on a plate 48, which may be adjustably fitted to slider 40 by clamp screws 49. As the slider moves forward it will enter underneath platen 35 and push the tag from below the same sidewise along the table 2, the advancing tag pushing the tag next ahead, so that in this way, a complete line of tags is moved along the table from left to right underneath partition 22, and pressure bars 139 hereinafter referred to, to be presented to the stringing mechanism proper and to be ultimately discharged. This movement takes place in substantial parallelism with step 39 so that the latter does not constitute an impediment to the movement of the tags in a line coaxial with the table.

To the right of partition 22, there extends along table 2, a rock shaft 50 carried by bearings 51 and 52.

Upon bearing 52, there is mounted, a post 53, the lower eyed end of which encircles the bearing, and is clamped thereto by set screws 54. Upon slacking these screws the post may be set at different inclinations to table 2, for a purpose hereinafter specified. To the upper end of post 53 is pivoted at 55 a tiltable string holder 56, Figs. 19 and 20. This string holder is furnished with a depending head or projection 57 which has a beveled edge, the head being perforated from top to bottom for the reception of the string 58. This string is delivered from a spool, reel or other source of supply (not shown) and passes through a guide 59 and a tension device 60 prior to its reception by the holder 56. The tension device consists of a pair of converging resilient blades, said device as well as guide 59 being mounted on partition 22. This partition is to the left of holder 56, provided with an arched abutment 61, adapted to be engaged (at all inclinations to which post 53 may be set) by the heel of holder 56, so as to maintain the latter normally in a horizontal position. The end of string 58, which is threaded through and projects slightly below holder 56, is adapted to be grasped by a string carrier which is so constituted, as to draw a short length of string through the holder, which length is thereupon further drawn out by a tiltable arm, hereinafter referred to, so as to double the string and thus form an elongated U shaped loop. Besides drawing a short section of the string through the holder, the carrier assumes the additional function of cutting the string into the length required for one tag, as soon as said U shaped loop has been full drawn out.

The right hand end of rock shaft 50, is encompassed by a non-rotatable tubular sleeve 62 which sustains such end of the shaft and is mounted in bearing 51. This bearing is adapted to be tightened upon sleeve 62, by a clamp screw 63, upon the slacking of which the sleeve may be turned upon shaft 50.

Upon sleeve 62 reciprocates a second upright post 64, having a hub 65, that encompasses sleeve 62, and is held thereto against independent rotation by a key 66, and groove 67.

To the upper end of post 64, is rigidly secured one jaw 68 of a combined string carrier and cutter, the other movable jaw 69 of which is pivoted at 70. Jaw 69 is held in its closed position by a spring blade 71 engaging the tail thereof, the tension of said blade, being adjustable by a nut 72 threaded on a screw 73, which carries a coiled spring 74, abutting against blade 71. Jaws 68, 69 are provided with upwardly extending heads or projections 75, and are beveled at their inner ends from top to bottom as indicated at 76. From the inner face of movable jaw 69, projects a beveled stop adapted to enter a corresponding aperture of fixed jaw 68, said stop assisting in preventing the slipping out of the string when the jaws are closed. A guide pin 78 extending upwardly from jaw 68, prevents the string from slipping over the jaw, while the loop is being drawn out. To the lower side of each jaw 68, 69 is affixed a cutting blade 79 said blades acting as shears, to sever the string while the latter is grasped by the jaws. Post 64 is reciprocated from a cam 80 mounted on shaft 4, and engaged by a cam lever 81 carried by a shaft 82 which is encompassed by a spring 83, which serves to hold lever 81, against cam 80. The upper end of shaft 82 carries an arm 84 the forked free end of which engages a circular groove 85 formed on hub 65, so that in this way, a rotation of the cam, will cause a reciprocating movement of hub 65 and consequently of post 64.

Assuming post 64 to be in its retracted position, and a loop to have been drawn out (Fig. 2), the post is advanced toward the left, so as to approach post 53. When by this movement the beveled headed jaws 68, 69 of the string carrier encounter the beveled head 57 of the string holder, the latter will spread jaws 68, 69 (against action of spring blade 71) so that the free end of the string which had been clamped between the jaws is released. Upon the further advance of the string carrier, the upwardly extending heads 75 of jaws 68, 69, will clear the depending head 57 of holder 56 (Fig. 19) so that the jaws will be again closed, by spring 71. This closing of the jaws will cause their blades 79 to cut off the length of string that had been previously drawn out into a loop, while the new end of the string, just severed, will become simultaneously clamped between the jaws above said blades. When now post 64 recedes, heads 75 by coming into engagement with head 57 will tilt the latter on its pivot 55, the heads having inclined inner faces (Fig. 19) which cause this tilting movement to take place. After the carrier had cleared the holder, it is retracted still further, so as to draw out a new short length of string adapted to be engaged by the loop forming arm now to be described. The string holder, after having been cleared by the string carrier, is retracted to its normal horizontal position by means of a spring 86, the heel of the holder 56 engaging the abutment 61.

Upon rock shaft 50, there is mounted between post 53 and 64, an oscillable arm 87 (Figs. 3, 6 and 7) provided at its free end with a pair of rounded and beveled fingers 88 (separated by a groove 89) and with a guide or stop 90 which prevents the clipping of the string. Rock shaft 50 is intermittently operated from a cam 91 (Fig. 23) engaged by a lever 92 rocking on counter shaft 30, and connected by link 94 pivoted at 93 to a cranked sleeve 95 fast on shaft 50.

When the string carrier is in its most retracted position, arm 87 is swung upward and backward, so that its beveled fingers 88 will temporarily raise and thus pass in the rear of the short length of string which had been drawn out by the carrier. When the arm is now swung forward and downward, its fingers will grasp and carry the string with it, and thus cause such a length of string to be reeled off and to be run through holder 56 as will go to form a U shaped loop, of a length determined by the sweep of the finger, and sufficient to string a single tag. After this loop has been formed, the portion of string thus reeled off, is cut off by the blades of the carrier in manner previously described.

When the arm 87 is in its lowermost (and substantially horizontal) position, the loop is engaged by an upright barbed needle 96 which draws both shanks of the loop through a tension device, and thence carries the bight of the loop beneath table 2, where said loop is opened by a spreader. Needle 96 is set within a holder 97, to which a reciprocal vertical movement is imparted by cam 98 and angle lever 99 turning on shaft 30.

The double tension device above referred to, which is more fully illustrated in Figs. 12-15, is carried by a bracket 101 secured to partition 22, and located a distance above table 2. It comprises a pair of jaws 102, 103 turning on a pivot 104 that extends upwardly from bracket 101, a pin 105 of said bracket, that extends into a socket 106 of said jaws holding the latter against lateral displacement. The jaws are normally closed upon each other, by means of a spring 107 coiled upon a screw 108 tapped into jaw 103 and engaged by a nut 109 by means of which the tension of the spring may be adjusted to regulate the grip of the jaws. Jaw 103 is provided on its inner face with a slot, within which is accommodated a rocking member 110 having a blade 110ª which moves freely in a cavity of the jaw, the rocking member being further provided with a pin or fulcrum 111 which is free to turn in a corresponding groove of the jaw. Opposite this rocking member, jaw 103 is furnished with a pair of inclined diverging faces 112, which furnish the clearance necessary for a slight turning of the rocking member. The latter is provided with a pair of grooves 113, that face corresponding grooves 114 formed on the inner side of jaw 102 and constituting in conjunction therewith, a pair of split tubular ducts, through which the two shanks of the loop respectively pass. Jaws 102 and rocking member 110 are furthermore provided with a pair of opposed central grooves 115, 116 that form conjointly a tubular needle passage. From jaw 102, there extends a projection 117 that rides over jaw 103, and prevents the corresponding string shank from slipping sidewise from out between jaw 102 and rocking member 110.

The needle 96 in rising, passes upwardly through grooves 115, 116 of the tension device and thence into groove 89 of arm 87, so as to hook the loop, which by said arm had been drawn out and carried over jaws 102, 103. The needle in descending will strip the loop off fingers 88, and pull the two shanks of the loop partly through the two passages formed on opposite sides of fulcrum 111, by the opposed grooves 113, 114. It will be seen that if, owing to an imperfection of the string, one of its shanks is somewhat thicker than the other shank, member 110, will be automatically swung on its fulcrum, 111, so as to thereby cause the diameter of the two shank passages to harmonize with the differences in the thickness of the string, and to consequently equalize the pressure exerted by spring 107 upon said shanks. In this way, the tension on both shanks of the string will always be equal, notwithstanding differences in their thicknesses, and thus both shanks will be held with equal force to the tension device, during the spreading and looping operations hereinafter referred to. Prior to the ascent of the needle, the tag to be strung had been fed to such a position between table 2 and the tension device, that its eye 9 is coaxial with the needle 96, and with the needle passage 115, 116 of the tension device. Thus as the needle descends with the loop it will not only draw the latter through the tension device, but also through the eye 9 of the tag, and thence such a distance below the table, as permits its engagement with the spreader. This spreader (Figs. 3 and 10ª) comprises a pair of jaws 118 pivoted at 119, to the recessed forward end of a sliding bar 120, movable beneath table 2, said rod receiving intermittent reciprocating motion from cam 121, (Fig. 25) by lever 122 turning on shaft 30, and by a pivoted link 123. Rod 120, moves within a trough shaped depression of table 2, which is covered by a top plate 124, and lined by a pair of guide plates 125. Jaws 118, are provided with fingers 126, and are adapted to be opened by a spring 127 housed within corresponding sockets of the jaws. When rod 120 begins to advance and while jaws 118 are still closed, fingers 126 will engage the string which is still gripped by the needle. The further advance of bar 120, will project jaws 118, so far beyond the guide plates 125, that the jaws will be free to be gradually opened by means of spring 127 and thus spread the loop and also carry it forward, the needle rising sufficiently to shed the string which is being drawn for some distance through the tension device, while the loop is thus spread. During this movement, the jaws will ride along edges 128, that prevent the same from spreading unduly, one of said jaws, being near the termination of its outer movement brought into harmony with the other jaw by means of a beveled projection 129.

After the loop has been spread and advanced in the manner described, the shanks of the loop will be drawn through the loop, and the latter will be tightened up to complete the operation. The means for drawing the shanks through the spread loop, consist of an oscillable hook or looper 130 fast on a shaft 131, which is rocked from cam 132 (Fig. 24) by lever 133, rod 134, and crank 135. The hook is so mounted that during its upstroke, its beak 136 passes through the spread loop, over the front edge of table 2, and thence over the top of said table, so as to become interposed between the tag and the tension device, beneath which the hook is free to swing. Beak 136 has an elongated eye 137 which is slitted as at 138 for the passage of the string shanks depending from the tension device. As the hook swings up these shanks will pass through said slit into the eye 137, so as to be taken along by the hook during its receding movement which now takes place. As the hook swings downward, the spreaders move backward (and close as the jaws re-enter between guide plates 125) to release the loop which owing to the pull exerted by the hook upon the string, will be caused to gradually contract and thus ride over the top of the beak. As the hook continues to recede, it will gradually draw the string shanks from the tension device through the loop, the resistance offered by such device, during such movement serving to tighten or contract the loop. When the hook has so far receded as to draw the free ends of the string out of the tension device and through the loop, the operation of stringing the tag is completed.

As already described, the tags receive intermittent forward movement along table 2, by means of slider 40. By this movement the tags after clearing pressure platen 35, are pushed below a pair of parallel guide rails 139 (Fig. 1) which are pressed down upon the face of said tags by springs 140, so as to hold the tags tightly against the table and prevent them from overlapping. To the right hand or delivery ends of rails 139, are connected by pivots 141, additional end rails 142 which are held against the table solely by their own weight, so that here the pressure exerted upon the tags is somewhat relaxed for free delivery. There is provided at the delivery end of the machine, a chute 143, which slopes downwardly toward the front, and is furnished with a conveyer belt 144, passing over rolls 145. One of these rolls receives intermittent rotary movement by suitable mechanism, such as cam 146, link 147, dog 148, and ratchet wheel 149, so as to impart a corresponding intermittent movement to the conveyer. After a certain number of tags have dropped from table 2, upon the conveyer, the latter is advanced, to carry a certain quantity of piles through a given distance, and thus permit the operator to pack them in specified quantities.

The operation of the machine will be understood from the above, and may be briefly stated as follows:—

The tags are by plunger 26, carried beneath platen 19 from whence they are intermittently advanced along the machine table so that their eyes will be coaxial with needle 96. Arm 87 swings down over the tension device to carry the string in loop form to a point above said tension device. The needle rises through the latter and through groove 89 of arm 87 to engage the loop, post 64 advances so that jaws 68, 69 release the end of the string, cut off the drawn out part of the string, and grip the new end of the string. Post 64 recedes, the arm 87 rises to engage a new section of the string, the needle 96 pulls the string so far through the tension device and tag, as to cause its loop to be opened up and pushed forward by the now advancing spreaders 118. Looper 130 moves up through the loop, grips the shanks between the tension device and the tag, and then recedes to pull the shanks through the loop and simultaneously tighten the latter. After a tag has thus been strung, it is fed along the table underneath rails 142 to the conveyer belt, the string carried by the tag, being during this movement, turned out of the path of the looper by a deflector 150.

In case it is desired to string smaller tags, in which the string is also shorter, the posts 53 and 64, are turned downwardly in parallelism to any extent desired, by unclamping post 53 from bearing 52, and unclamping sleeve 62 from bearing 51. During any position which the posts may be made to assume, the arched abutment 61 will also become engaged by the heel of the string holder 56.

In Fig. 33, the machine is adapted for stringing tags devoid of reinforcing rings. In this case, the plunger 26 and pressure plate 35 are omitted, and the tags are stacked in a magazine formed between slider 40 and partition 22, by means of a removable frame 151. The presser foot 23, is by screw 152 secured to partition 22, opposite slider 40, while a weight 153 is placed upon the tags 154 stacked up in the magazine. The motion of the slider will thus intermittently advance the tags along the table to be strung and delivered in manner previously described.

I claim:

1. A tag stringing machine comprising a string holder, a reciprocal string carrier adapted to receive a string from said holder, a string cutting device, a member adapted to draw said string out into an elongated loop, a tension device, a needle adapted to engage said loop and draw the same through said tension device and through a tag, a spreader for opening the loop, and a looper for drawing the ends of the string out of the tension device and through the loop.

2. A tag stringing machine comprising a string holder, a reciprocal string carrier adapted to receive a string from said holder, a string cutting device, a member adapted to draw said string out into an elongated loop, a tension device, a needle adapted to engage said loop and draw the same through said tension device and through a tag, a spreader for opening said loop, and an oscillative looper having an apertured and slotted beak which is adapted to be projected below the tension device to engage the string and draw the ends thereof through the loop.

3. A tag stringing machine comprising a table, means for intermittently feeding tags along the table, means for drawing out a section of string from a string-supply, means for drawing out said section into an elongated loop, means for applying a tension to the loop, means for drawing the loop through said tension-applying means, means for opening the loop, and means for drawing the ends of the string out of the tension applying means, through said loop and for simultaneously contracting the loop.

4. In a tag stringing machine, a post, means for tiltingly mounting the post, a string holder pivoted to the post, said holder having a heel, and an arched abutment adapted to engage said heel, during different adjustments of the post.

5. In a tag stringing machine, a first member, a string holder pivoted thereto, a second slidable member, a pair of jaws carried by the second slidable member, and string-cutting means secured to the jaws.

6. In a tag stringing machine, a first member, a string holder pivoted thereto, said holder having an apertured downwardly extending beveled head, a second slidable member, a pair of jaws carried by said second member, said jaws having upwardly extending beveled heads, that are adapted to operatively engage the head of the string holder.

7. In a tag stringing machine, a first member, a string holder pivoted thereto, said holder having an apertured downwardly extending beveled head, a second slidable member, a pair of jaws carried by said second member, said jaws having upwardly extending beveled heads that are adapted to operatively engage the head of the string holder, and shearing blades secured to the lower sides of said jaws.

8. In a tag stringing machine, a shaft, a sleeve encompassing the same, a post having a hub that is slidable along the sleeve, a combined string carrier and cutter mounted on the post, and means for turning said sleeve together with said post on said shaft.

9. In a tag stringing machine, a rock shaft, a loop forming arm carried thereby, a non-rotatable sleeve encompassing the rock shaft, a post having a hub that is slidable along said sleeve, means for guiding the hub, and a combined string carrier and cutter mounted on the post.

10. In a tag stringing machine, a rock shaft, a loop forming arm carried thereby, a non-rotatable sleeve encompassing the rock shaft, a post having a hub that is slidable along said sleeve, means for guiding the hub, a pair of jaws carried by the post, one of said jaws being movable, a spring engaging the movable jaw, and a pair of cutting blades carried by the jaws.

11. In a tag stringing machine, a string holder, a combined string carrier and cutter reciprocal toward and away from the string holder, and an oscillable loop-forming arm interposed between said string holder and said combined string carrier and cutter.

12. In a tag stringing machine, a string holder, a combined reciprocal string carrier and cutter, an oscillable loop-forming arm intermediate said holder and combined carrier and cutter, said arm being provided at its free end with a pair of beveled fingers and with a groove between said fingers, and with a barbed needle adapted to enter said groove.

13. In a tag stringing machine, means for forming a loop having a pair of shanks, a tension device, and a fulcrumed member on said tension device that is adapted to bear against said shanks on opposite sides of its fulcrum.

14. In a tag stringing machine, a tension device comprising a member, a rocker encompassed thereby, a pair of string ducts formed between said rocker and said member, and a needle passage likewise formed between said rocker and said member.

15. In a tag stringing machine, a tension device comprising a pair of jaws, one of said jaws being slotted, a rocker engaging the slotted jaw, a pair of string ducts formed between the rocker and the other jaw, and a needle passage likewise formed between said rocker and said last named jaw.

16. In a tag stringing machine, a tension device comprising a pair of pivoted jaws, a spring adapted to normally close said jaws, means for adjusting the tension of said spring, a rocker pivoted to one of said jaws, and a pair of string ducts and a needle passage formed between said rocker and the other jaw.

17. In a tag stringing machine, a tension device having a rocker, an oscillable loop-forming arm adapted to be projected over said device, and a needle adapted to be passed through the tension device, and to draw a doubled string from the arm through said device and past said rocker.

18. In a tag stringing machine, a pair of pivoted spring controlled jaws, a pivoted rocker encompassed thereby, a pair of string-guides and a needle passage formed between said rocker and one of said jaws, an oscillable loop-forming arm adapted to be projected over said jaws, and a needle adapted to be passed through said passage, and draw a doubled string from the arm through said string guides.

19. In a tag stringing machine, means for forming an elongated loop, a needle adapted to engage said loop, and a spreader adapted to open said loop, said spreader comprising a sliding member, a pair of jaws pivoted thereto, means for opening the jaws upon the advance of the sliding member, and a guide for contracting said jaws upon the retraction of said member.

20. In a tag stringing machine, means for forming an elongated loop, a tension device, a needle adapted to draw the shanks of said loop through said tension device, and an oscillable hook adapted to be projected beneath said tension device, said hook having a slitted eye adapted to engage said shanks.

21. In a tag stringing machine, means for looping a string, means for cutting the string, a tension device, means for drawing the string through said tension device and through a tag, means for passing the ends of the string through the loop and for simultaneously contracting the loop.

22. In a machine of the character described, in combination, a string guide and a string gripper, one having movement toward and from the other, a member movable between the above mentioned members to draw out into an elongated loop a string held fast by said string gripper and passing through said string guide, and means to secure the loop to a card.

23. In a machine of the character described, in combination, a work table, a string guide and a string gripper adjustable toward and from the work table, a member movable between the guide and gripper and toward and from the work table, to draw a length of string into an elongated loop, and means to secure said loop to a card on the work table.

24. In a machine of the character described, in combination, means for drawing a loop of string through a card, and a tension device to engage the shanks of the loop, said tension device being self-adjusting to apply the same tension to both shanks.

HORACE L. ROBERTS.